June 8, 1926

H. D. PENNEY

REENFORCED GAME FRAME

Filed Feb. 16, 1923

1,588,140

Witnesses:
S. C. Badeau
Achilles Rovegno

Inventor:
Harold D. Penney,
By his Att'y, J. H. Richards

Patented June 8, 1926.

1,588,140

UNITED STATES PATENT OFFICE.

HAROLD D. PENNEY, OF PELHAM, NEW YORK, ASSIGNOR, BY MESNE ASSIGNMENTS, TO A. G. SPALDING & BROS., OF NEW YORK, N. Y., A CORPORATION OF NEW JERSEY.

REENFORCED GAME FRAME.

Application filed February 16, 1923. Serial No. 619,413.

This invention relates to striking implements for use in games, especially tennis rackets, and to methods for making the implements.

One object of the invention is to provide an improved method and construction whereby great strength combined with the necessary flexibility and proper weight are imparted to the implement and a frame of great durability is afforded.

Another object is to provide an implement of the character mentioned having a frame of tubing formed in cross-section to provide additional strength for the frame.

Another object is to provide an implement of the character mentioned having a frame of tubing, the tubing being indented to provide opposed concave walls and flattened to provide opposed straight walls, the material of the tubing being incidentally "worked" during the indenting and flattening whereby greater strength and rigidity of the tubing is afforded.

Another object is to provide an implement of the character mentioned the frame of which is of tubing and has means arranged transversely of the tubing for strengthening the frame.

Another object is to provide an implement of the character mentioned the frame of which is of tubing having series of strengthening means arranged transversely thereof and connecting opposed walls of the tubing.

Another object is to provide an implement of the character mentioned in which protection is afforded for the outer or looped ends of the strings of the net against damage by contact with the ground or other sources of injury during use of the implement.

Another object is to provide an implement of the character mentioned the frame of which is of tubing, protection for the outer or looped ends of the strings of the net being afforded by concavity of the sides of the tubing.

Another object is to provide an implement of the character mentioned having a frame of tubing and having means for protecting the strings of the net from damage by contact with abrading surfaces of the frame.

I attain these and such other objects as may appear during the subjoined description by way of example of one embodiment of the invention shown in the accompanying drawings which form part of this specification and in which Figure 1 is a face or plan view partly in section, of the oval or head portion of a racket.

Similar reference characters denote similar parts throughout the several views.

Figure 1:
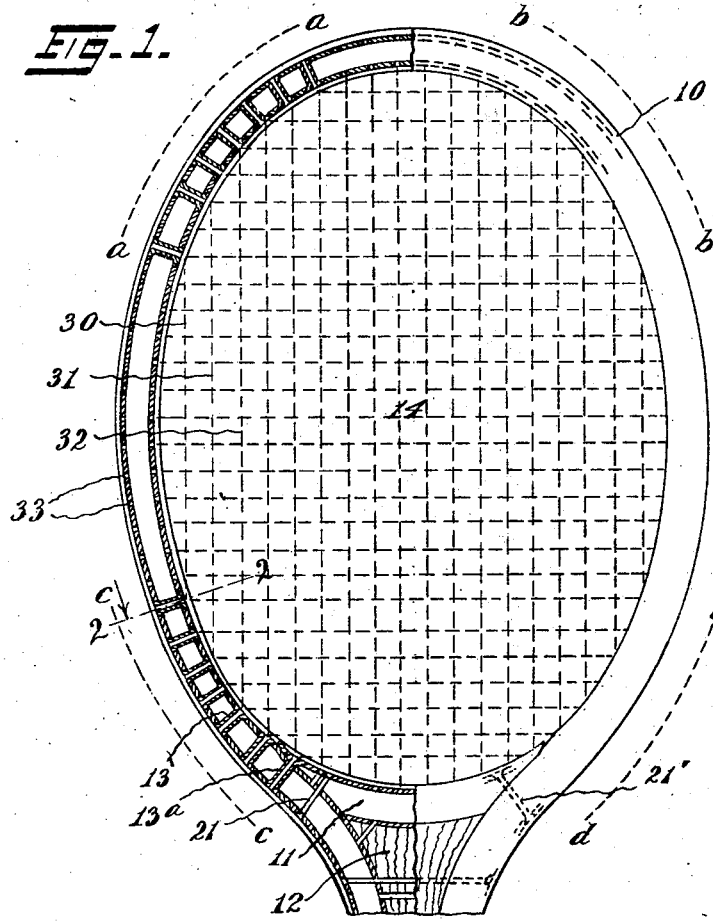

The invention as shown by said oval or head portion of a racket, comprises in its main parts or elements, the frame 10, the intermediate throat member 11, the throat piece 12, the strengthening and protecting bushings 13, and the net 14.

In common practice a tube of metal, preferably of light metal such as magnesium, is furnished in desirable racket frame length, and substantially of rectangular cross sectional area. The tube length is then bent to racket form of conventional or desired pattern.

When the frame has reached this form the metal is not stiff enough to make a rigid frame, and in the case of magnesium, which may not be tempered like forms of other metals by heat treatment, it becomes necessary to "work" the metal in order to give it the necessary stiffness.

Figure 4:
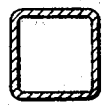
Figure 4, is a cross-sectional view of a preferred form of tubing.
Figure 5:
Figure 5, is a cross-sectional view of the preferred form of tubing provided with opposed concave walls.

This is accomplished by taking the conventional frame of rectangular form tubing shown by Fig. 4, and indenting it as indicated in Fig. 5 on opposite sides, as at 15 and 16, the squeezing action incident to this indenting causing the other two sides of the rectangle to bulge as at 17 and 18, Fig. 5. Thus, by the act of indenting the metal on two sides, all four sides of the rectangular tube are manipulated.

Figure 6:
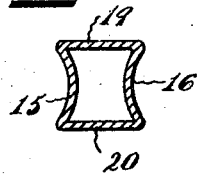
Figure 6, is a cross-sectional view of the preferred form of tubing provided with opposed concave side walls and opposed straight or flat upper and under walls, Figs. 4, 5 and 6 being on the same scale as Fig. 2.

The bulged side of the tubing is then rolled between rolls and flattened back again as indicated at 19 and 20, Fig. 6, and this action further reworks the two bulged sides, so that the manipulation of the magnesium metal sets up crystallizing strains which tend to reset the molecules of the metal within the frame or tube and cause the tube to become laterally much stiffer than when the metal is in its natural or normal condition.

It will, therefore, be noted that a frame such as 10 is provided which is made strong and rigid in a transverse plane, first, by the indenting of the sides as a mechanical means and secondly, by causing the metal within the frame to be "worked" thereby setting up hardening strains so that the final article is very much stiffer than it would be if the tube were left in its original unworked condition, the frame 10 thus having concave outer and inner sides and straight or flat upper and under sides.

The intermediate throat or bridge member 11 is of the same tubing as the frame 10 having concave outer and inner sides and straight or flat upper and under sides and is curved or bowed towards the handle portion, not shown, to conform to the bend of the frame 10 and complete the oval shape of the head of the racket. The throat member 11 is secured to the frame 10, as by the pins 21 and 21' passing through the throat member and through the frame 10, and is arranged adjacent to the throat piece or wedge 12, the upper edge of the throat piece 12 being received in the outer concave or indented side of the throat member 11 for securing these members together.

Figure 2:
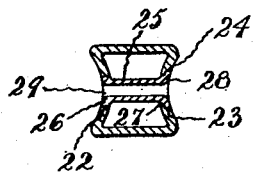
Figure 2, is a sectional view on the line 2—2 of Fig. 1, and on an enlarged scale.

For further strengthening the frame 10 and for the further purpose of preventing abrasion of strings of the net 14, the frame is provided at the sections a—a, b—b, c—c and d—d with a series of openings 22 and 23 through the outer and inner concave sides of the tubing of the frame, the openings 23 in the inner side of the tubing substantially registering with the openings 22 in the outer side of the tubing, the openings 23 each having on its inner edge an annular rabbet 24, Fig. 2.

Figure 3:
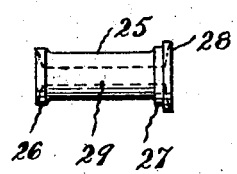
Figure 3, is a side view of a strengthening and protecting filler or bushing on an enlarged scale.

The bushings 13 preferably are of the same material as the tubing 10. Each of these bushings or eyelets comprises the body portion 25, the outer head 26, the inner head 27 and the cap 28 on the inner head, the cap 28 forming an annular flange. Each bushing has a bore 29 therethrough, the bore 29 flaring outwardly at both ends or mouths of the bushings, Figs. 2 and 3.

The bushings 13 are forced into the openings of the tubing 10, from the inner side of the tubing, the outer heads 26 of the bushings engaging in the openings 22 and the cap 28 engaging in the rabbets 24 of the openings 23, the bushings, because of being of the same material as the tubing 10, to an extent blending or molding therewith at the points of engagement. It is thus seen that these bushings provide a transverse strengthening means for the frame 10 at the beforementioned sections of the frame.

It will be noted that the longitudinal strings such as 30, 31 and 32 of the net, adjacent to the sides of the frame, in the present instance as well as in the case of the customary racket, pass through the lacing holes of the frame, in the present instance the lacing holes being the bores of the bushings 13, at an acute angle to the longitudinal line of the racket, and that in use of the racket and impact of the ball upon the net there is a tendency of the edge of the frame at such angles to wear or abrade the strings. In the present instance by means of the flaring ends or mouths of the bores of the bushings 13 the acuteness of the angle is obviated and all possibility of abrasion of the strings by the edges of the tubing is removed, while the looped ends, not seen, of the strings lie in the concave outer side of the tubing and are protected thereby. The bushings 13ª on opposite sides of the frame 10 passing through the tubing and the throat member 11, are in all respects the same as the bushings 13 except that they are of greater length, the openings for receiving these bushings however extending through the throat member and having rabbets, seen in Fig. 1, on the inner sides of the throat member corresponding to the rabbets 24 on the inner side of the tubing forming the frame 10.

For strings of the net 14 which pass through the frame either in straight lines or at obtuse angles and are not so liable to abrasion, registering lacing holes such as 33 are provided where required through the tubing of the frame 10.

Having thus described my invention, it should be understood that there may be modifications thereof and variations therein without departing from the spirit of the invention, or exceeding the scope of the appended claims.

What I claim and desire to protect by Letters Patent is:—

1. A racket comprising a head portion having transverse holes through the frame provided with annular rabbets at their mouths, a net for the head portion, and bushings in said holes for passage of the strings of the net therethrough, the bushings having flanged end portions engaging in said rabbets.

2. A racket comprising a head portion having transverse holes through the frame provided with annular rabbets at their mouths, a net for the head portion, and bushings in said holes for passage of the strings of the net therethrough, the bushings having flanged end portions engaging in said rabbets and having flaring portions of their bores at the flanged end portions.

3. A racket comprising a head portion having transverse holes through the frame, a net for the head portion, a throat portion having transverse holes through the frame, and bushings in said holes of the head and throat portions for passage of the strings of the net therethrough.

4. A racket comprising a head portion having transverse holes through the frame, a net for the head portion, a throat portion having transverse holes through the frame, and bushings in said holes of the head and throat portions, the bushings having flaring portions of their bores at the ends of the bushings.

5. A racket comprising a head portion having transverse holes through the frame provided with annular rabbets at their mouths, a net for the head portion, a throat portion having transverse holes through the frame provided with annular rabbets at their mouths, and bushings in said holes of the head and throat portions, the bushings having flanged end portions engaging in said rabbets.

6. A racket comprising a head portion having transverse holes through the frame provided with annular rabbets at their mouths, a net for the head portion, a throat portion having transverse holes through the frame provided with annular rabbets at their mouths, and bushings in said holes of the head and throat portions having flanged end portions engaging in said rabbets and having flaring portions of their bores at the ends of the bushings.

7. A racket comprising a frame having a head portion and a throat portion each provided with transverse holes through the frame, a net for the head portion, a bridge piece for the throat portion having transverse holes registering with said holes of the throat portion, and bushings in said holes of the head portion and in said registering holes of the bridge piece and throat portion for passage of the strings of said net therethrough.

8. A racket comprising a frame having a head portion and a throat portion each provided with transverse holes through the frame, a net for the head portion, a bridge piece for the throat portion having transverse holes registering with said holes of the throat portion, and bushings in said holes of the head portion and in said registering holes of the bridge piece and throat portion and having flaring portions of their bores at the ends of the bushings.

9. A racket comprising a frame having a head portion and a throat portion each provided with transverse holes through the frame, the holes of the head portion having annular rabbets at their mouths, a net for the head portion, a bridge piece for the throat portion having transverse holes registering with said holes of the throat portion and having annular rabbets at the mouths of the holes, and bushings in said holes of the head portion and in said registering holes of the bridge piece and throat portion having flanged end portions engaging in said rabbets of the head portion and bridge piece.

10. A racket comprising a frame having a head portion and a throat portion each provided with transverse holes through the frame the holes of the head portion having annular rabbets at their mouths, a net for the head portion, a bridge piece for the throat portion having transverse holes registering with said holes of the throat portion and having annular rabbets at the mouths of the holes, and bushings in said holes of the head portion and in said registering holes of the bridge piece and throat portion having flanged end portions engaging in said rabbets of the head portion and bridge piece and having flaring portions of the bores of the bushings at the ends of the bushings.

11. In a racket of the character described, a tubular frame having an oval head portion and a throat portion adjoining the head portion, and a tubular bridge piece for the throat portion formed in conformity with and arranged as part of the curve of the oval head portion.

12. In a racket of the character described, a frame having an oval head portion and a throat portion adjoining the head portion both said portions having transverse holes through the frame, a bridge piece for the throat portion formed in conformity with and arranged as part of the curve of the oval head portion and having transverse holes through the frame registering with said holes of the throat portion, and bushings in the holes of the bridge piece and extending through the holes of the throat portion.

13. In a racket of the character described, a tubular frame having an oval head portion and a throat portion adjoining the head portion both said portions having transverse holes through the frame, a tubular bridge piece for the throat portion formed in conformity with and arranged as part of the curve of the oval head portion and having transverse holes through the frame registering with said holes of the throat portion, and bushings in the holes of the bridge piece and extending through the holes of the throat portion.

14. In a racket of the character described, a tubular frame having a head portion and a throat portion adjoining the head portion both said portions having transverse holes through the frame, a tubular bridge piece for the throat portion arranged in conformity with and forming part of the curve of the head portion and having transverse holes through the frame registering with said holes of the throat portion, a wedge in the throat portion conforming in shape at its sides to the shape of the throat portion and engaging at one of its ends the adjacent side of the bridge piece, and bushings in the holes of the bridge piece and extending through the holes of the throat portion.

15. In a racket of the character described a frame having an oval head portion and a throat portion adjoining the head portion, a bridge piece for the throat portion formed in conformity with and arranged as part of the oval curve of the head portion and having in cross-section a concave side, and a wedge in the throat portion conforming at its sides to the shape of the throat portion and engaging at one of its ends in the concave side of the bridge piece.

16. In a racket of the character described, a tubular frame having an oval head portion and a throat portion adjoining the head portion both said portions having transverse holes through the frame, a tubular bridge piece for the throat portion formed in conformity with and arranged as part of the curve of the oval head portion and having in cross-section a concave side and having transverse holes through the frame registering with said holes of the throat portion, a wedge in the throat portion conforming at its sides to the shape of the throat portion and engaging at one of its ends in the concave side of the bridge piece, and bushings in the holes of the bridge piece and extending through the holes of the throat portion.

HAROLD D. PENNEY.